United States Patent Office 3,477,461
Patented Nov. 11, 1969

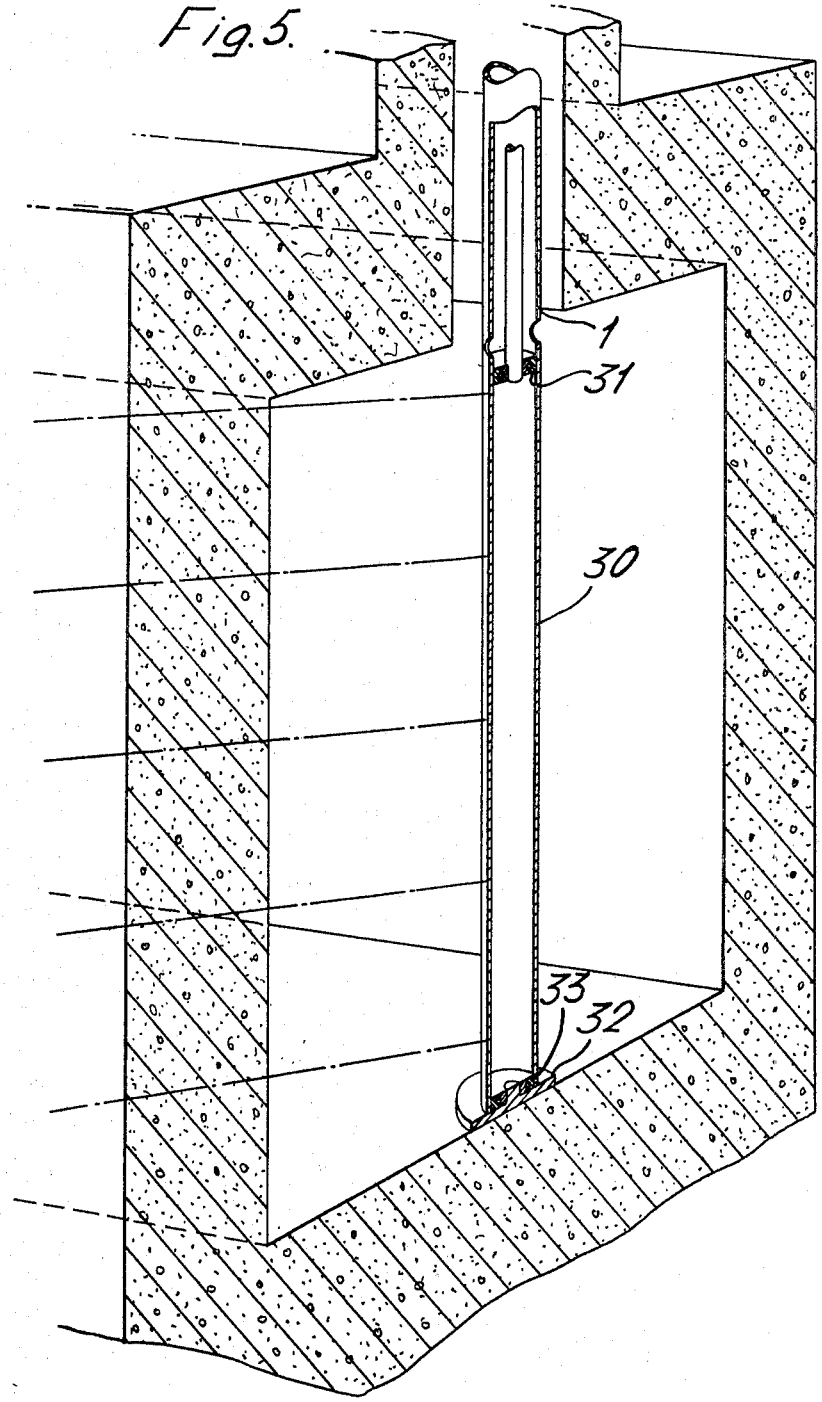

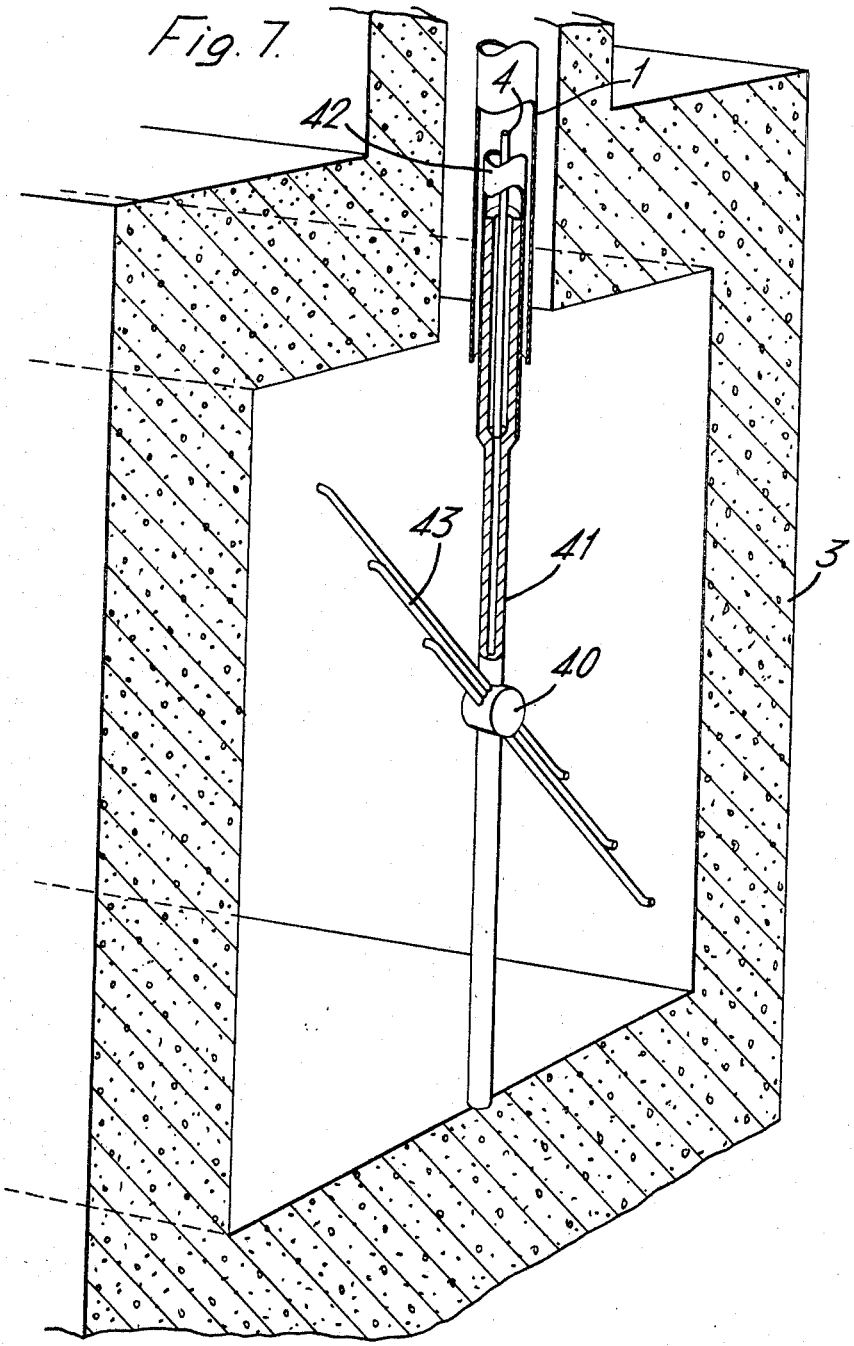

3,477,461
RADIOISOTOPE INJECTION DEVICE FOR MEASUREMENT OF FLUID FLOW
Colin G. Clayton, Shippon, Abingdon, and Ramon Spackman, Upton, Didcot, England (both % United Kingdom Atomic Energy Authority, 11 Charles II St., London, SW. 1, England)
Filed Jan. 19, 1966, Ser. No. 521,579
Claims priority, application Great Britain, Jan. 20, 1965, 2,600/65
Int. Cl. B01f 5/04; G01f 1/00; G01n 23/12
U.S. Cl. 137—599.1    4 Claims

ABSTRACT OF THE DISCLOSURE

Injection apparatus comprises means to withdraw a subsidiary flow from a mainstream, means to inject into the subsidiary flow a measured quantity of radioisotope, an injection probe situated in the mainstream, and pump means receiving the subsidiary flow after addition of the radioisotope to deliver the same to the injection probe. The probe has a plurality of nozzles designed to distribute the subsidiary flow to a plurality of points within the main flow in quantities proportional to the velocity of the main flow at the points of delivery.

---

Figure 1:
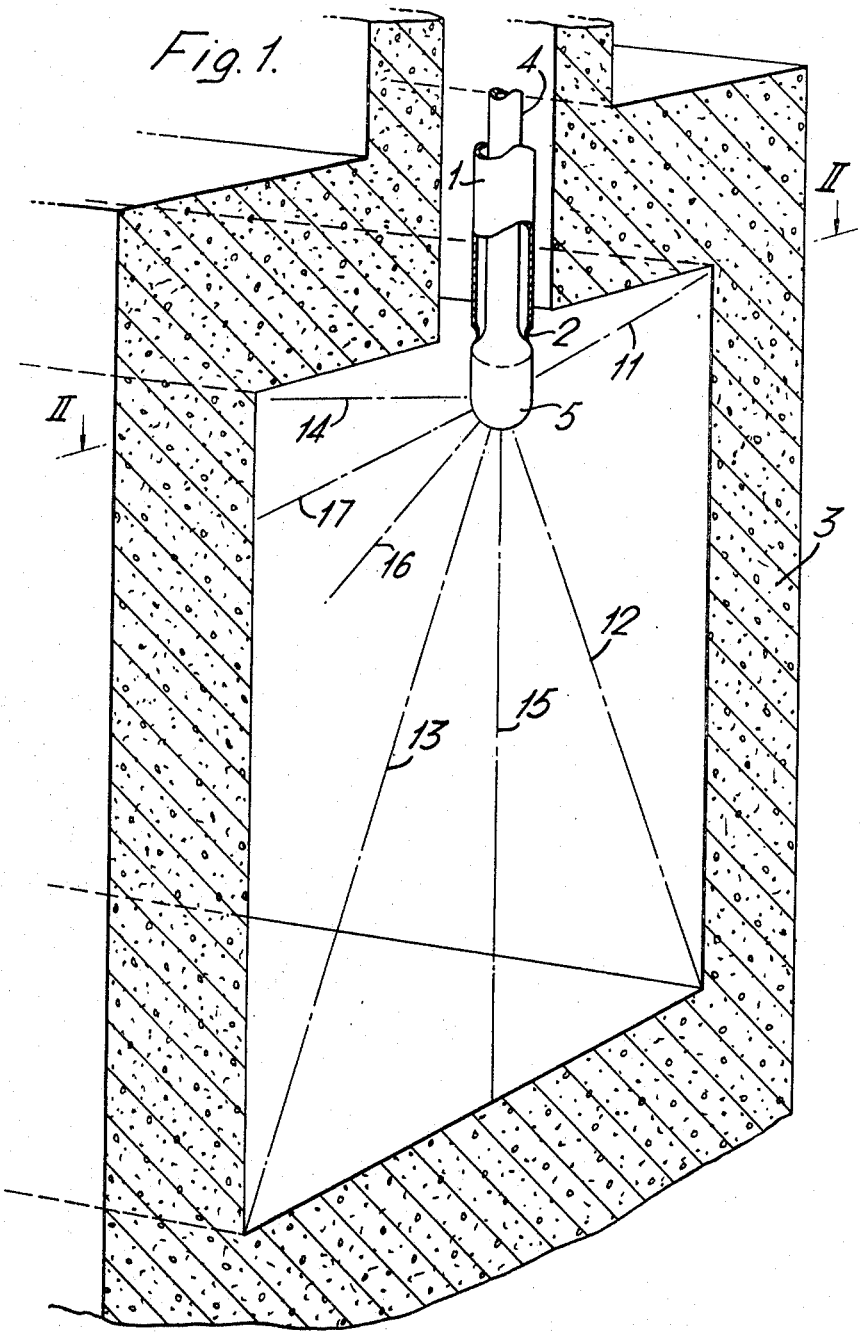

The present invention is concerned with injection devices intended to inject a relatively small quantity of liquid into a much larger quantity of liquid. Injection techniques such as this are widely used in flow measurements by the radioisotope dilution technique.

It will be known that in radioisotope dilution techniques a known quantity of radioactive material is injected into the body of flowing liquid and its concentration is measured at a down-stream station in order to obtain a measure of the quantity of flow in the stream. An alternative technique is to inject the tracer at a known time and measure the time interval before it arrives at the measuring station. In these techniques it is essential that very thorough mixing should take place in the stream.

The simplest type of injector terminates in a single orifice either at the wall of a conduit or at some point in the cross-section of the stream flowing through the conduit and for this type of injector the mixing distance may vary between one hundred and three hundred conduit diameters. The mixing distance can be reduced by using several widely spaced injection points simultaneously but in large diameter conduits, especially the concrete conduits used for cooling water in power stations, it is difficult to devise a suitable supporting structure for such an injection system and this is particularly true when rapid insertion and withdrawal of the injectors is required.

It is an object of the present invention to provide an improved apparatus for injection.

The preferred method of using the apparatus comprises withdrawing a subsidiary flow of liquid from the main stream, injecting a radioisotope into this subsidiary flow of liquid, passing the subsidiary flow of liquid through a pump whereby thorough mixing is achieved and injecting the subsidiary liquid into the main stream in such manner that the quantity of subsidiary liquid delivered is proportional to the quantity of main stream passing the point of delivery.

According to the present invention there is provided injection apparatus comprising means to withdraw a subsidiary flow from a main stream, means to inject into this subsidiary flow a measured quantity of radioisotope, pump means receiving the subsidiary flow after addition of the radioisotope to deliver the same to an injection probe situated in the main stream, said probe having a plurality of nozzles designed to distribute the subsidiary flow to a plurality of points within the main flow of quantities proportional to the velocity of the main flow at the points of delivery.

It should be appreciated that the present invention relies on two main features, namely the delivery of a relatively large amount of liquid into the main stream and therefore the use of high pressure jets or the like, and the delivery of this subsidiary flow throughout the cross sectional area of the main stream in such a way that the quantity of subsidiary flow which is delivered is proportional to the quantity of the main stream which is passing that point. It will be understood that, in general, the range of a jet depends on the momentum of the jet and therefore the effective amount of tracer fed to each jet can easily be controlled by varying the size or velocity of the jet.

The quantity of radioisotope actually injected into the subsidiary stream is desirably very small in order to reduce shielding problems and therefore a small unidirectional acting pump can be used and it will be known that this can be constructed with great accuracy. However, since the injection into the main stream is effectively via the use of a subsidiary stream the total injected volume can be kept high, thereby to ensure maximum turbulence at the injection points and also minimising the risk of one or more of the jets becoming blocked.

It will also be apparent that this injection system can be used both for constant rate and pulse injection methods of flow measurement.

Figure 2:
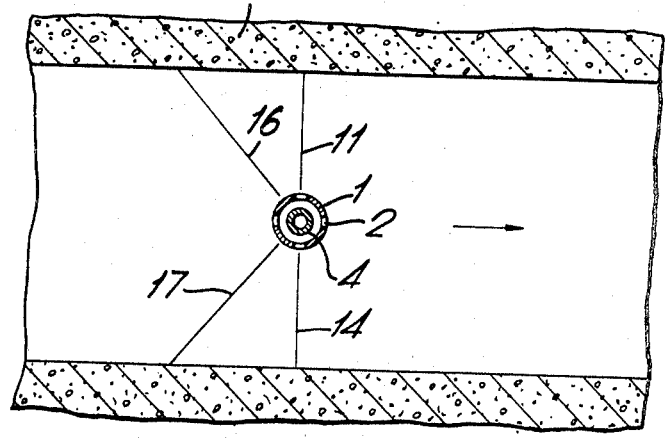
Figure 4:
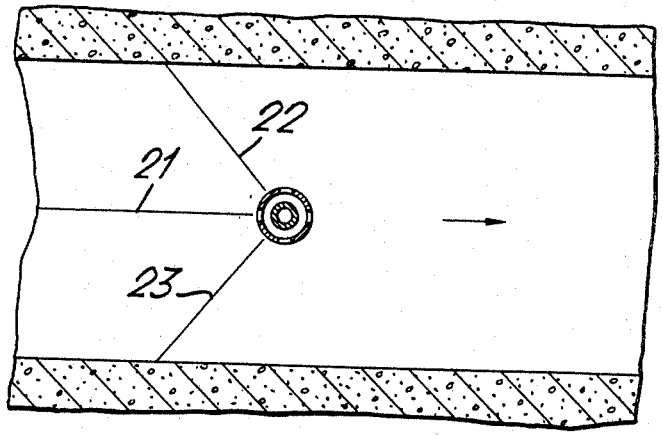
Figure 3:
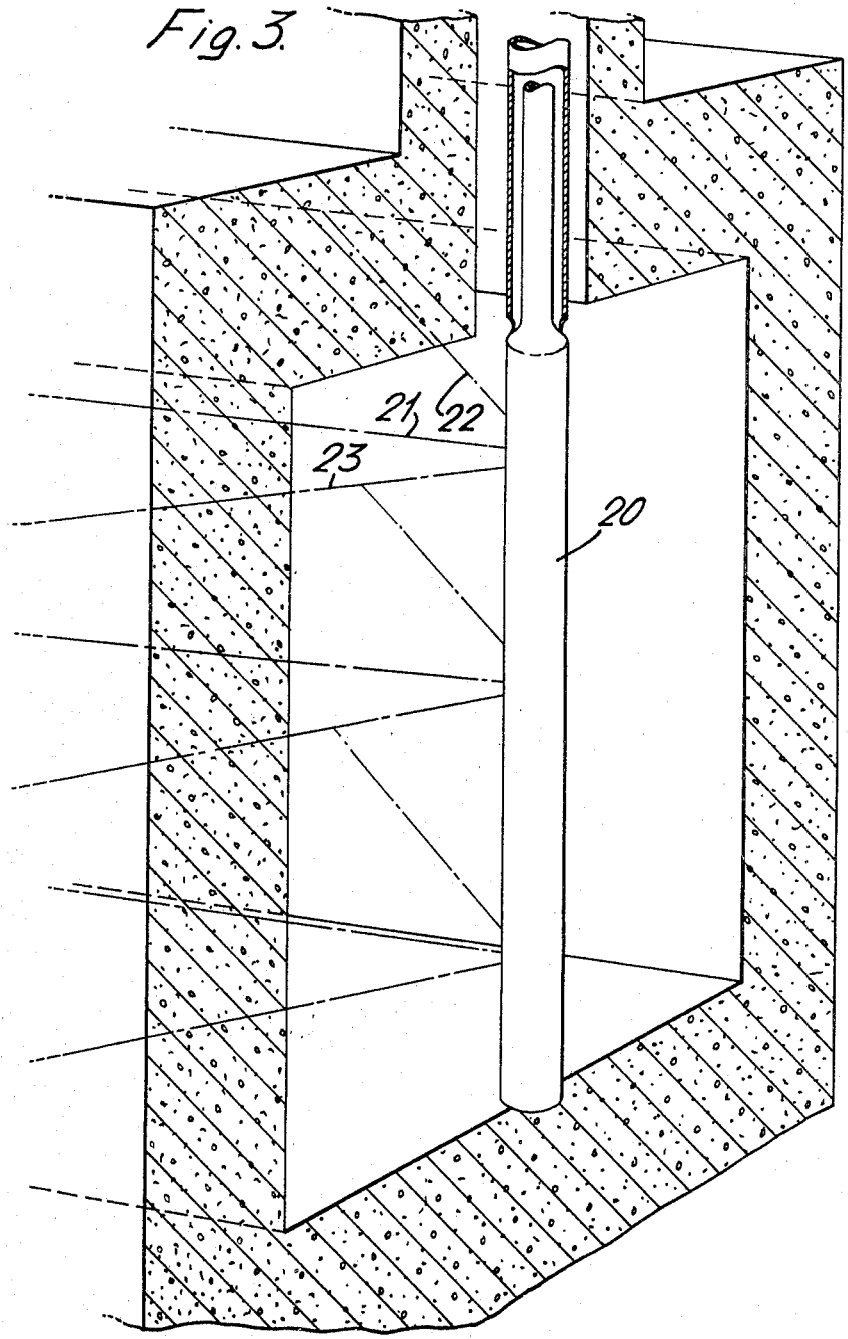
Figure 6:
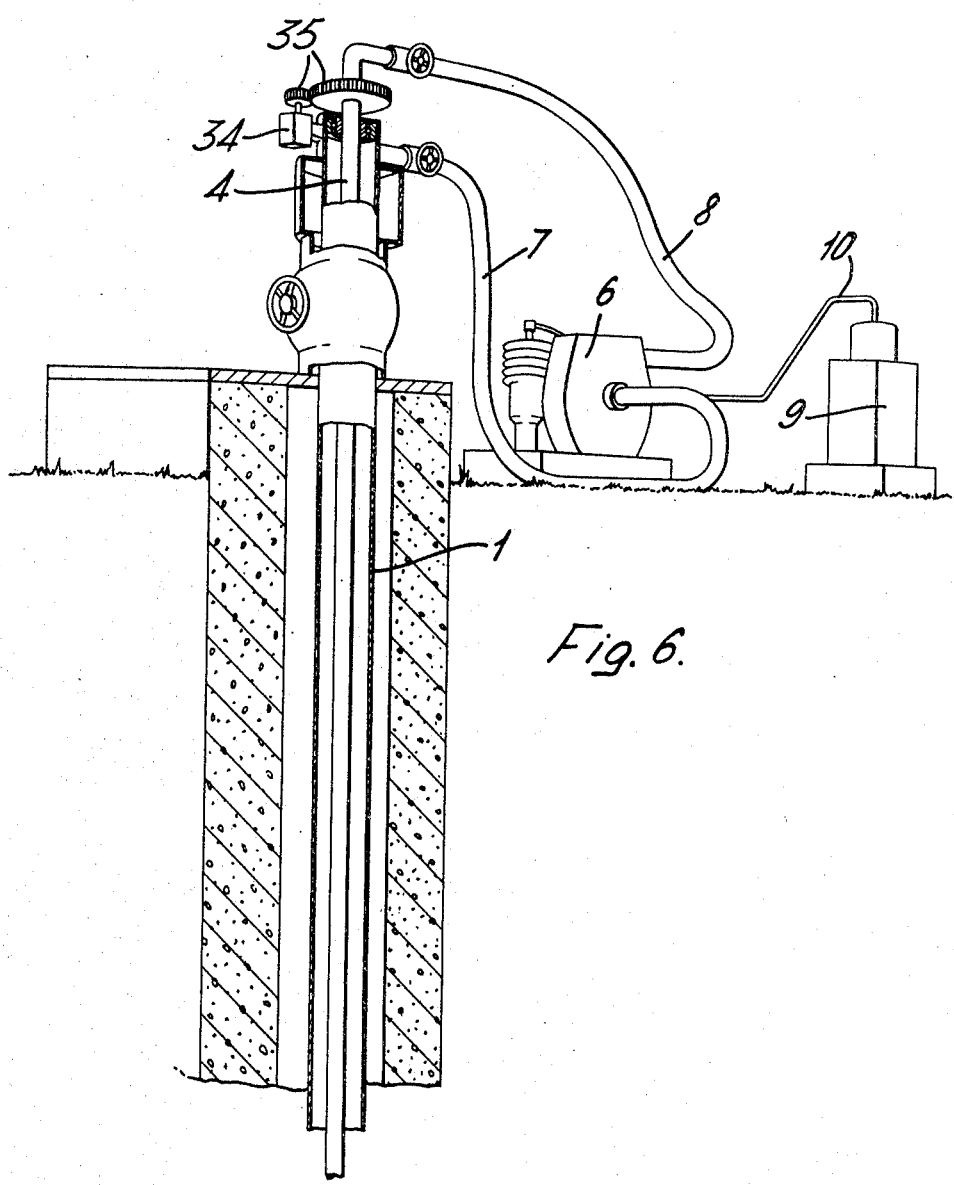

In order that the present invention may more readily be understood, certain embodiments of the same will now be described by way of example and with reference to the accompanying drawings wherein:

FIGURE 1 is a perspective, cut-away view showing an injector nozzle in place in a conduit, FIGURE 2 is a plan view corresponding generally to FIGURE 1 and taken on the line II—II of FIGURE 1, FIGURE 3 is a view similar to FIGURE 1 of a second embodiment, FIGURE 4 is a plan view similar to FIGURE 2 of the embodiment of FIGURE 3, FIGURE 5 is a view similar to FIGURE 1 of a third embodiment, FIGURE 6 is a perspective view, with parts in section, of the pump means associated with the injector of FIGURE 5, and FIGURE 7 is a view similar to FIGURE 1 of a fourth embodiment.

Referring now to the drawings, and in particular to FIGURES 1, 2 and 6, it will be seen that in all embodiments the probe comprises an outer conduit 1 provided with intake holes 2 at such a position that they are within the stream of liquid flowing in a conduit 3. Located within the conduit 1 is a coaxial conduit 4 which forms a delivery pipe, the space between the conduits 1 and 4 forming an intake pipe. A nozzle head 5 is mounted upon the end of the delivery pipe immediately below the intake holes 2.

As is more clearly shown in FIGURE 6, a pump 6 is provided and this receives the liquid entering the intake pipe to which it is connected by means of a flexible pipe 7 and delivers it via a flexible pipe 8 to the top of the pipe 4. A suitable radioisotope injection pump 9 delivers the radioisotope tracer by means of a pipe 10 to the low pressure side of the pump 6 whereby thorough mixing is achieved in the pump 6 prior to delivery of the subsidiary flow of liquid to the nozzle head 5.

In the embodiment illustrated in FIGURES 1 and 2, the nozzle head 5 is designed for insertion into the conduit to the minimum distance necessary to ensure that it is entirely within the stream in the conduit 3 and consequently the force on the probe is small. It therefore follows that it is easy to insert and withdraw the probe whilst the liquid in the conduit 3 is flowing. The nozzle head 5 is provided with a plurality of nozzle jets and since the conduit 3 is rectangular in cross section these jets comprise four jets designed to direct streams 11, 12, 13 and 14 towards the four corners of the conduit. A further jet delivers a stream 15 diagonally across the conduit and two further jets direct streams 16 and 17 upstream towards the mid-point of the sides of the conduit parallel to the length of the probe. The arrangement has been chosen in which the probe enters the conduit at the mid-point of the upper side so that the jets on the two sides of the nozzle head 5 are of the same dimensions. The mechanical dimensions of each jet are so selected that the amount of liquid delivered by them is proportional to the velocity of the main flow at the points of delivery, and it will be clear that these mechanical dimensions will depend upon the specific dimensions of the conduit 3 and indeed upon whether it is of rectangular cross section as shown or any other cross section.

The second embodiment is illustrated in FIGURES 3 and 4 and is particularly suitable for use in rectangular conduits as shown. In this embodiment, the nozzle head 20 extends diametrically across the conduit from the centre point of the upper side to the centre point of the lower side. The nozzle head 20 is provided with a plurality of sets of jets (three such sets being shown) and each set comprises three individual jets which deliver the flow of subsidiary liquid in a horizontal plane within the conduit, one such jet being designed to deliver a jet 21 directly upstream and two jets to deliver streams 22 and 23 towards either side of the conduit as is more clearly seen in FIGURE 4.

In the embodiment shown in FIGURES 5 and 6, the nozzle head 30 is of the same general form as shown in FIGURE 3 but in place of sets of jets it is provided with a plurality (in this case five) of single jets each designed to inject the subsidiary flow in an upstream direction. In order to ensure thorough mixing the nozzle head 30 is arranged to oscillate through an angle of approximately 80° to either side of the direction of flow of the main stream. To permit this oscillation the nozzle head 30 is joined to the outer conduit 1 by means of a ball race 31 and is also connected to a mounting plate 32 by means of a further ball race 33. Oscillation of the nozzle head 30 is arranged by causing the inner conduit 4 to oscillate by means of a small vane-type motor located within the pipe 8 and driving the conduit 4 relative to the pipe 8. In order to provide for the necessary variation in the quantity of tracer fed into the main stream as the nozzle head 30 oscillates, a valve 34 is driven by gears 35 from the conduit 4.

A fourth embodiment is designed primarily for conduits of circular section although it may be utilised in conduits of rectangular section as illustrated in FIGURE 7. In this embodiment a nozzle head 40 is provided and is mounted upon a member 41 diagonally arranged across the conduit 3. This member 41 is mounted at its upper end upon a tube 42 located between the conduits 1 and 4 and is of a sufficiently robust construction to withstand the forces of the main flow acting upon it. The nozzle head 40 is designed to rotate and is therefore constructed in the form of a spinner carrying two identical sets 43 of nozzle arms arranged diametrically to the spinner 40. Each set of nozzle arms comprises three individual arms of different lengths each of which terminates in an angled nozzle so that automatic rotation of the nozzle arms is ensured by the force of the subsidiary flow passing through the nozzles. It will be apparent that positive drive of the nozzle arms can be arranged by means of a turbine or the like housed within the spinner head 40. The use of aligned nozzle arms means that it is relatively easy to insert and withdraw the unit when the arms are aligned with the main length of the probe 41.

We claim:
1. Injection apparatus comprising means to withdraw a subsidiary flow from a main stream, means to inject into this subsidiary flow a measured quantity of radioisotope, an injection probe situated in the main stream, pump means receiving the subsidiary flow after addition of the radioisotope to deliver the same to said injection probe, said probe having a plurality of nozzles designed to distribute the subsidiary flow to a plurality of points within the main flow in quantities proportional to the velocity of the main flow at the points of delivery.

2. The apparatus of claim 1, wherein the probe has a nozzle head having a plurality of fixed nozzle jets.

3. The apparatus of claim 1, wherein the probe has a nozzle head having a plurality of fixed nozzle jets and means are provided to cause said head to oscillate and to vary the flow of subsidiary liquid to the head in dependence upon the position of the nozzles.

4. The apparatus of claim 1, including a unidirectionally acting pump delivering the radioisotope into the subsidiary flow of liquid.

References Cited
UNITED STATES PATENTS

| | | | |
|---|---|---|---|
| 2,233,965 | 3/1941 | Strovink | 137—3 X |
| 2,631,242 | 3/1953 | Metcalf. | |
| 2,835,481 | 5/1958 | Cox | 137—3 X |
| 2,843,138 | 7/1958 | Gilman | 137—3 X |
| 2,893,412 | 7/1959 | Fox et al. | 137—3 |
| 3,049,617 | 8/1962 | Fabian et al. | |
| 3,342,193 | 9/1967 | Deering et al. | 137—3 |

ALAN COHAN, Primary Examiner

D. H. LAMBERT, Assistant Examiner

U.S. Cl. X.R.

73—194; 137—604; 250—45.3